(12) United States Patent
Stewart

(10) Patent No.: US 8,103,723 B1
(45) Date of Patent: Jan. 24, 2012

(54) MESSAGE SERVER THAT RETAINS MESSAGES DELETED BY ONE CLIENT APPLICATION FOR ACCESS BY ANOTHER CLIENT APPLICATION

(75) Inventor: Jeffrey B. Stewart, San Leandro, CA (US)

(73) Assignee: Google Inc., Mountain View, CA (US)

( * ) Notice: Subject to any disclaimer, the term of this patent is extended or adjusted under 35 U.S.C. 154(b) by 1125 days.

(21) Appl. No.: 10/961,787

(22) Filed: Oct. 7, 2004

(51) Int. Cl.
*G06F 15/16* (2006.01)

(52) U.S. Cl. ......... 709/206; 709/205; 709/208; 709/209

(58) Field of Classification Search .................. 709/206, 709/205, 208, 209
See application file for complete search history.

(56) References Cited

U.S. PATENT DOCUMENTS

| | | | |
|---|---|---|---|
| 6,134,582 A * | 10/2000 | Kennedy | 709/206 |
| 6,167,402 A * | 12/2000 | Yeager | 707/10 |
| 6,185,551 B1 * | 2/2001 | Birrell et al. | 707/3 |
| 6,330,589 B1 * | 12/2001 | Kennedy | 709/206 |
| 2003/0172118 A1 * | 9/2003 | Bilansky et al. | 709/206 |
| 2005/0108246 A1 * | 5/2005 | Dillon | 707/10 |
| 2005/0234850 A1 | 10/2005 | Buchheit et al. | 707/1 |
| 2008/0052324 A1 * | 2/2008 | Choubey et al. | 707/201 |

* cited by examiner

*Primary Examiner* — Jeffrey Pwu
*Assistant Examiner* — Abdelnabi Musa
(74) *Attorney, Agent, or Firm* — Morgan, Lewis & Bockius LLP

(57) ABSTRACT

A first processing session is entered with a POP client. A set of messages from a message repository is identified as available for access by the POP client. When the POP client causes a message to be deleted from the message repository (either by explicit or implicit actions), the message is removed from the set of messages available for access by the POP client but maintained for access by another POP client or by another messaging program. The messages available may be limited by a session size and they may be ordered newest to oldest. In some instances messages are part of conversations and the number of conversation from which the message may be drawn is limited.

42 Claims, 8 Drawing Sheets

MESSAGE SERVER THAT RETAINS MESSAGES DELETED BY ONE CLIENT APPLICATION FOR ACCESS BY ANOTHER CLIENT APPLICATION

TECHNICAL FIELD

The present invention relates generally to remote access to electronic messages, and in particular to providing POP3 access to a large message repository.

BACKGROUND

The Post Office Protocol (POP), more commonly known as POP3 to denote the third version of the protocol, provides a way for electronic messaging programs such as Outlook and Mozilla to interface with a central, remote message repository. Oftentimes, a user may not continuously have the messaging program up, running and connected to the repository for number of reasons, for example, the user may use a mobile computer that is not always connected to a server; the user may power down the computer when its not being used; or the computer may periodically enter a power saving mode. POP3 provides a simple interface such that messages may be retrieved from a central message server and manipulated at a local computer at the user's leisure. POP3 assumes that most users will delete messages from the central server as they are retrieved.

On the other hand, some messaging applications, such as Gmail from Google Inc., are designed with the assumption that a user will leave all messages on the server. Gmail provides a web-based interface to a central repository of messages that the user can access and manipulate in accordance with a novel, conversation-based approach. The conversation and search features provided in Gmail are designed to work with the entire corpus of the user's messages.

What is needed are systems and methods which overcome the opposing goals of POP3 implementing applications and messaging applications designed to access a very large message repository when both access the same message repository.

SUMMARY

In some embodiments, a method for processing messages includes entering into a first processing session with a first client application, the first processing session associated with a user account. A set of messages is identified as available for access by the first client application and a message processing request for a message is received from the first client application. The message is stored in a message database and is included in the set of messages. In response to the message processing request, the message is removed from the set of messages available for access by the first client application. At the same time, the message is maintained in the message database for access by a second application during a second processing session associated with the user account.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings. Like reference numerals refer to corresponding parts throughout the several views of the drawings.

DESCRIPTION OF EMBODIMENTS

An application flag associated with a stored message as well as other techniques can be utilized to overcome the opposing design goals of a POP client and an application that is designed to work well with a large message repository. When the POP client desires a message to be deleted from the message repository (either by explicit or implicit actions), the message is removed from the set of messages available for access by the POP client but maintained for access by another POP client or by another messaging program. One technique for doing this includes setting an application flag associated with a message. Other techniques include limiting the messages available during any POP session and ordering messages at the server from newest to oldest. In some instances, when messages are part of conversations, a limitation is imposed on the number of conversations from which messages may be drawn during any one POP session.

Figure 1:
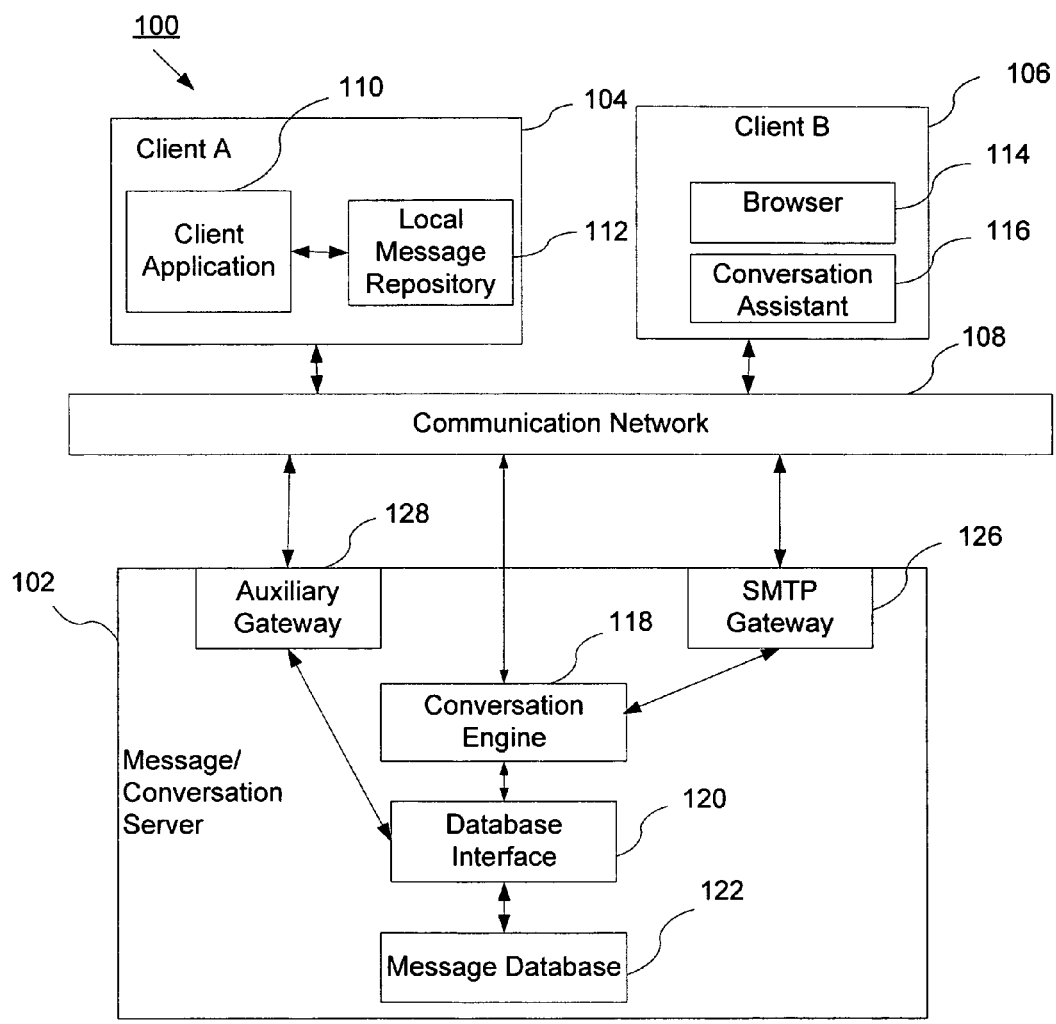
FIG. 1 depicts an exemplary system in which some embodiments of the present invention may operate.

FIG. 1 depicts a system in which embodiments of the invention may be implemented and used. A system 100 includes a message/conversation server 102, a client A 104, client B 106, and a communication network 108. Client A 104 and client B 106 interact with the message/conversation server 102 via the communication network 108. The communication network 108 may include the Internet, one or more local area networks (LANs), one or more wide area networks (WANs), other types of networks, or a combination of such networks.

The client A 104 includes a client application 110 and a local message repository 112. A user interacts with the client application 110 on the client A 104 to access messages on the message/conversation server 102. The client B 106 includes a browser 114 and a conversation assistant 116. A user interacts with the browser 114 on the client B 106 to manipulate messages on the message/conversation server 102 via the conversation assistant 116. In some embodiments, the browser 114 and conversation assistant 116 are integrated into a single application.

Each of the client A 104 and the client B 106 can be one of any number of devices including a desktop computer, personal digital assistant (PDA), a wireless device, a gaming console, an internet kiosk, a workstation, a portable computer, and the like. It is sufficient that they enable a user to interact with the client application 110 or browser 114, as appropriate, and communicate with the message/conversation server 102. In some embodiments, the client application 110, the browser 114, and conversation assistant 116 can be on the same client (e.g., client 104 or 106). Referring to client A 104, the client application 110 is an application (e.g., Outlook, Outlook Express, Eudora, Mozilla, or a Program for Internet News & Email (PINE)) that interacts with the message/conversation server 102 using POP3 and uses local message repository 112 to store retrieved (i.e., downloaded) messages. The client application 110 may be enabled to interact with multiple mail servers using POP3 or other protocols, and with multiple user accounts on the same mail server.

Referring to client B 106, the browser 114 can be a general purpose Internet browser (sometimes called a Web browser) having a browser window used for displaying conversations, or it can be a dedicated browser application having a window for displaying conversations and messages returned from the message/conversation server 102. The conversations and messages in the conversations may be rendered by the browser 114 using the hypertext markup language (HTML) or any other appropriate rendering technology. After a user submits a request through the browser 114 (via conversation assistant 116) to the message/conversation server 102 to access messages stored in his personal account, the message/conversation server 102 identifies a plurality of conversations in the user's personal account according to the user's request and transfers them as well as a set of display instructions back to the client B 106. The conversation assistant 116, in response, generates one or more forms following the display instructions, each form including information of some of the conversations. The forms are then submitted to and rendered by the browser 114. In another embodiment, the conversation assistant 116 may reside in the message/conversation server 102 or in another server or proxy.

The message/conversation server 102 handles requests from and responses to the both the conversation assistant 116 and the client application 110, via the communication network 106. The message/conversation server 102 may have many overlapping features with the conversation management server described in U.S. application Ser. No. 10/914,035, filed Aug. 6, 2004, which is hereby incorporated by reference in its entirety. In other embodiments, the server 102 may be a message server without the conversation management features discussed in this document and U.S. application Ser. No. 10/914,035.

Still referring to FIG. 1, the message/conversation server 102 includes a conversation engine 118, a database interface 120, a message database 122, an SMTP gateway 126, and an auxiliary gateway 128. The conversation engine 118 may respond to a variety of requests from the conversation assistant 116 related to messages and return conversation-based responses via its connection with the communication network 108. The conversation engine 118 accesses the message database 122 via database interface 120. The database interface 120 allows, among other things, the conversation engine 118 to store messages in various data structures along with associated information as appropriate, to search the messages and related data structures based on different search criteria, and to delete messages.

The SMTP gateway 126 is also connected to the communication network 108 and is more directly involved in receiving and sending messages. In some embodiments, the SMTP gateway 126 transmits and receives messages using the Simple Mail Transfer Protocol (SMTP). The SMTP gateway 126 may receive a new message from the communication network 108 and send the message to conversation engine 118 for additional processing, such as assigning the received message to a conversation and storing the message. Additionally, the SMTP gateway 126 receives messages from the conversation engine 118 and then transmits (via the communication network 108) those messages to the recipient addresses specified in the messages.

The auxiliary gateway 128 is connected to the communication network 108 and database interface 120. The auxiliary gateway 128 receives and responds to requests generated by the client application 110 and manipulates the messages and data stored in the message database 122 via the database interface 120. The auxiliary gateway 128, in some embodiments, implements various versions of POP, such as POP3. POP, in accordance with its various versions, allows a user to download electronic mail messages stored on a remote server via local messaging clients, for example, Outlook, Outlook Express, Eudora, PINE and Mozilla. POP is generally designed to allow a user to work in an off-line mode. In a typical POP session a client application 110 downloads all the user's messages and sends requests to delete them from the server after downloading. The user then reads the messages off-line. Although described in relation to POP, it will be readily apparent that the concepts and embodiments described herein would apply equally well to other types of mail access protocols, including but not limited to the Internet Message Access Protocol (IMAP), without undue experimentation.

When the client application 110 implements POP3 (or other protocols), it may interact with the message/conversation server 102 to access messages stored for the user in the message database 122. For example, the client application 110 can download messages from the message database 122 via auxiliary gateway 128 for subsequent processing and storage in local message repository 112.

Although the message/conversation server 102 and its components are illustrated as discrete elements in FIG. 1, it should be understood that in some embodiments each may be implemented using one or more servers so as to improve throughput and reliability, cost or other factors. Alternately, all components of the message/conversation server 102 could be implemented on the same server, or in various combinations. For instance the message database 122 could be implemented on several distinct servers that communicate with and work in conjunction with each other as one large repository serving many users. As another example, the auxiliary gateway 128 and the SMTP server 126 could be implemented on the same server or different servers.

Figure 2:
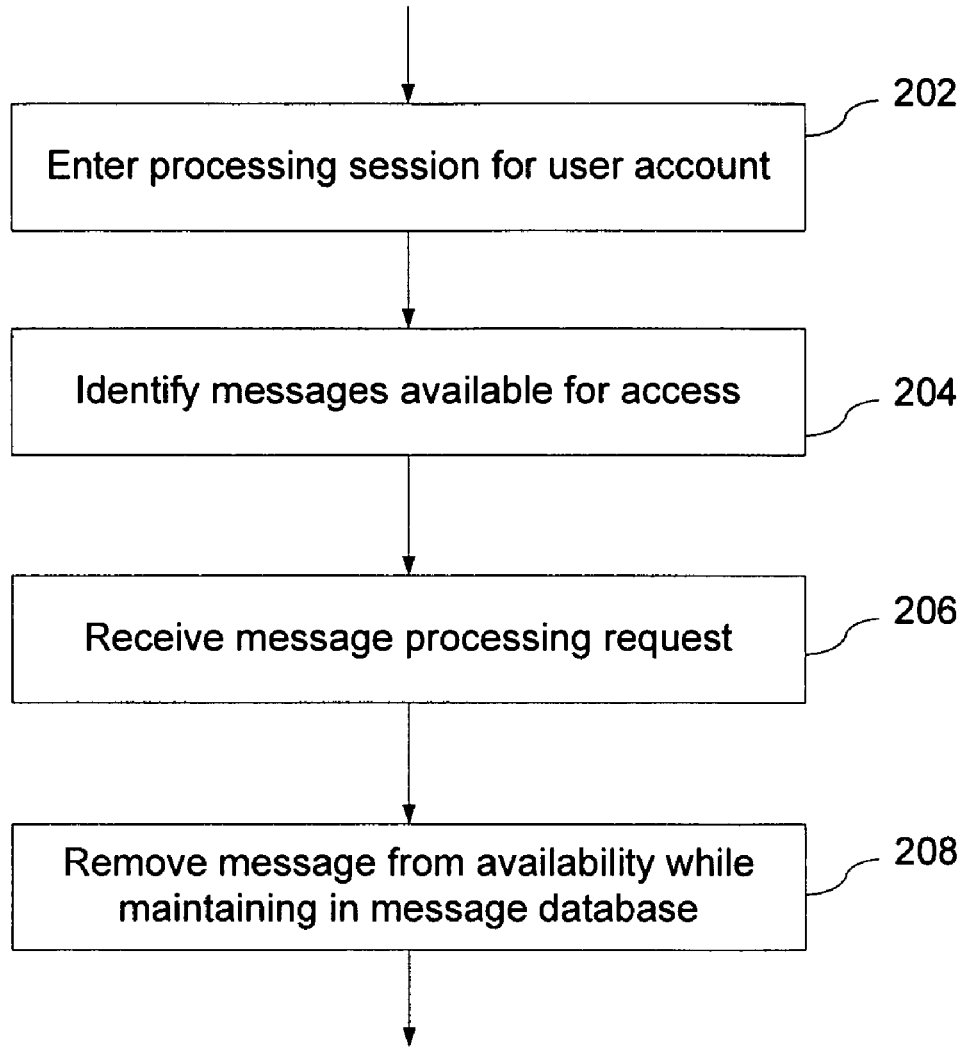
FIG. 2 illustrates a representative process for processing messages according to some embodiments of the invention.

In order to begin interacting with message/conversation server 102 to access the messages in the message database 122, the client application 110 enters into a processing session with the auxiliary gateway 128 using POP3 (FIG. 2, 202). The auxiliary gateway 128 identifies which messages are available for access by the client application 110 for the particular user account which is being accessed during this session (204). The client application 110 may interact only with the messages identified. A client application 110 would normally expect to have available for access a number of messages sequentially numbered from 1 to n, where n represents the number of messages in the user's account and where message 1 is the oldest received message, and n is the newest. The client application 110 is permitted to access all of the available messages (such as for retrieval or deletion). The client application 110 then sends the auxiliary server 128 message processing requests (206). The message processing requests are used by the client application 110 to obtain information about and perform actions on the messages. For example, the client application 110 may request the number of messages and their respective lengths, obtain header information for a particular message, download a message via a retrieve command (e.g., a "RETR i" command, where i is the message number), and delete a particular message (e.g., "DELE i" command, where i is the message number). In one embodiment, the commands which the client application 110 may use are specified in RFC 1939 and RFC 3502, both of which are available from the Internet Engineering Task Force (IETF), and related documents which describe the POP3.

As mentioned earlier, POP3 is not designed to work efficiently with large numbers of messages for a particular user account on a message store. As the number of messages on a mail server grows, it becomes increasingly unwieldy to manage the list of messages. The list of messages (i.e., for a particular user account) must be reprocessed for each user each time the client application begins a session with the mail server. In some instances the client application would need to access the entire list of messages for a particular user account and perform operations on it to determine, for example, which messages are new (i.e., which have not been previously downloaded by the client application), or which messages have not yet been read. The exchange of information from the server and examination by the client application uses resources and lengthens the response time perceived by the user.

Therefore, in accordance with embodiments of the invention, when the client application 110 chooses to delete a particular message from the message database 122, the message is made unavailable to the client application 110 during subsequent sessions but is maintained in the message database for subsequent access by other applications (208). Referring back to FIG. 1, such applications may be the conversation assistant 116 and conversation engine 118. As long as the message is maintained in the message database 122, it can remain available to the conversation assistant 116 and conversation engine 118. These applications can then operate on the entire corpus of a user's message store where, among other things, a conversation-based view and full searching on all conversations and messages is efficiently provided.

Figure 3:
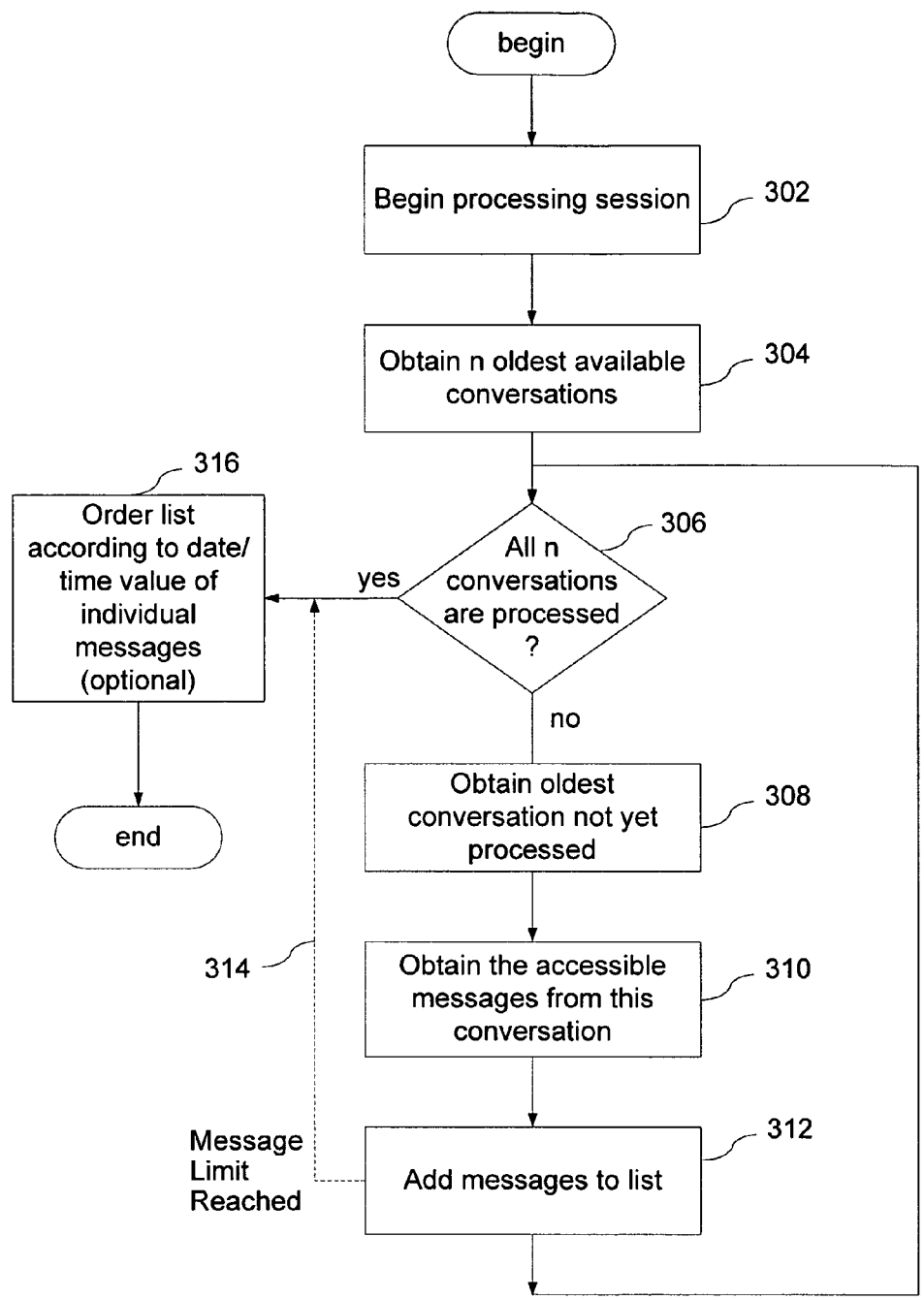
FIG. 3 illustrates a representative process for obtaining messages from conversations according to some embodiments of the invention.

Identifying messages which are available to the client application 110 can be provided in a number of ways and one of ordinary skill in the art will recognize others after reading the following exemplary description. Referring to FIG. 3, after a session has been initiated (302) the messages available for access are identified by the auxiliary gateway 128. In some embodiments, messages are associated with particular conversations. Messages are associated with particular conversations based on temporal, sender, message identifier, subject information or combinations thereof. Each conversation has a date/time value associated with it corresponding to the date/time value of the last message associated with the conversation. As used herein, "date/time" value refers to whatever date value and/or time value is associated with a particular message. Dates and/or times may be associated with messages based on the date and/or time of its creation, transmission, receipt or other event. The n oldest conversations that contain at least one available message are obtained (304), where n represents a maximum number of conversations from which to draw the available messages. The value of n can be set to various integer values and the exact value is a design choice; for example n could be set as an integer between 200 and 275. The value acts as an upper bound on the number of conversations processed during the session. Of course, if there are less than n conversations available (i.e., less than n conversations that have one or more messages available for downloading to the client application), then those conversations that are available, up to n, are used. If all the conversations have not yet been processed (306—no), then from the set of conversations, the oldest conversation not yet processed is identified based on its date/time value (308). From the identified conversation, the messages which are available to client application 110 for access are identified (310). The available messages may be identified in a number of ways. In some embodiments, an application flag associated with each message is examined. Those messages which do not have the flag set are available for access. As each message is checked (from oldest to newest in a particular conversation), those which are available for access are added to the list of available messages (312). In some embodiments, a limitation is placed on the number of messages available for any given session. The size limitation could be system defined, user defined, and/or variable based on a user or system characteristics such as the type of client A 104, the connection speed of client A 104 to communication network 108, or the load on the communication network 108. When the number of messages on the list reaches the size limitation, then, as shown by the dotted line 314, no more message are identified and added to the list. When all of the conversations have been processed (306—yes) the client application 110 can request information about the available messages and can perform actions on them.

In one embodiment, the auxiliary gateway identifies the n newest available conversations (having at least one available message) at 304, instead the n oldest available conversations. This embodiment has the advantage that a user who has a large number of available messages and is downloading messages for the first time, or who has not accessed his/her messages in a long time, will receive his/her newest available messages during a first processing session, instead of his/her oldest available messages.

In some embodiments, the application flag may be a label associated with a particular message and identification of available messages could include examining one or more labels associated with a message. In some embodiments, the label indicates that the message associated with the label is be "available" and in other embodiments, the label indicates that the message associated the label is "unavailable". In the later case, messages available for access would be those messages which are not labeled "unavailable". In some embodiments, other labels could also be examined. For example, messages having labels indicating that they are in a "trash" state and/or potentially "spam" would remove a message from availability. In some embodiments, conversations could be unavailable (and therefore not identified in 304) when certain labels associated with the conversations meet certain criteria (such as a label of "trash" or "spam"). Other labels could also be examined, such as "inbox" or "read". In one embodiment, only messages which are labeled "inbox" and "available" are treated as being available for access. One of ordinary skill in the art will recognize various ways to combine labels to create a pool of available message and/or conversations.

Because in some embodiments the list of messages is created from examining the oldest conversation first, and then identifying newer conversations, and the date/time value of a conversation is based on the latest received message in that conversation, it is possible that a newer conversation might have available messages which are older than the date/time value of an older conversation. In some embodiments, this is a logical extension of the conversation view-point and one would expect to see related messages adjacent to each other in the list of messages. When a user downloads the messages in list order, they would be received in this fashion, i.e., the available messages in the conversation are downloaded together. However, in some optional embodiments, the list of available messages is reordered according to a date/time value of the individual messages (316). For instance, the list of messages may be ordered from oldest to newest. Alternately, the list of messages may be ordered from newest to oldest.

Figure 4:
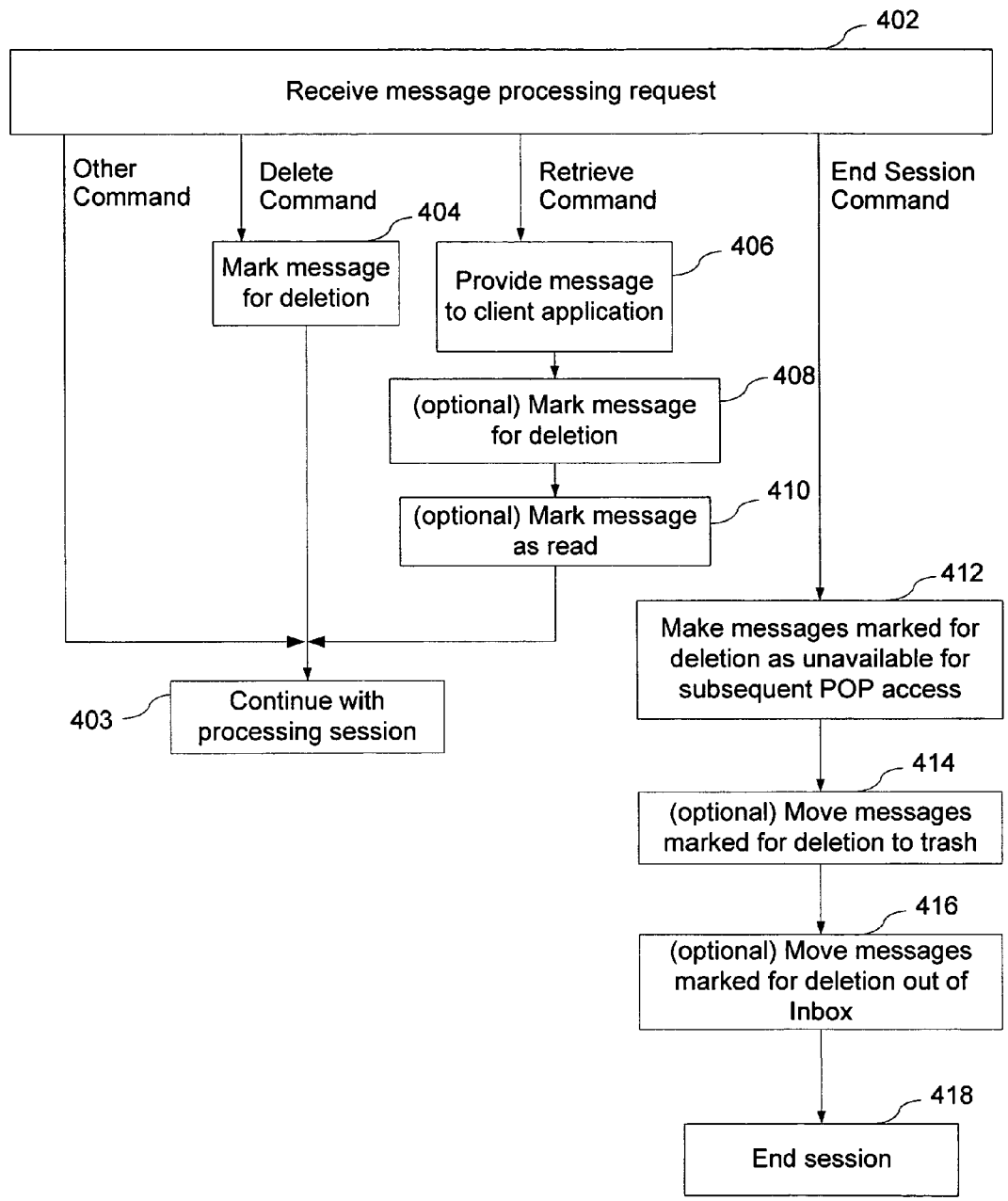
FIG. 4 illustrates representative processes for receiving message processing requests according to some embodiments of the invention.

Once the list of available messages is created, the client application 110 may perform a number of different types of processing on the message. In a typical POP3 session, the client application may request a summary of the messages using a "STAT" command. In response, the auxiliary gateway 128 responds by returning a number value representing the number of messages available and the total size of all the messages. Other commands are available, but referring to FIG. 4, three are of particular relevancy to embodiments of the invention. When a message processing request is received (402) it is determined whether the processing is one of the three commands of interest: delete ("DELE n"), retrieve ("RETR n"), or end session ("QUIT"). If the request is not one of the three, then processing continues in accordance with relevant POP3 specifications (403).

When the processing request is to delete message n, then the message is marked for deletion (404). Typically in a POP3 session, messages are marked for deletion in response to a delete command, but the actual deletion processing occurs at the end of the session. After the message is marked for deletion, the processing session continues (403). When the processing request is to retrieve message n, then the message n is downloaded to the client application 110 (406). A default operation of most client messaging applications implementing POP3 is to delete messages which they have retrieved. Accordingly, at some point after retrieval, the client application 110 using this default sends a delete command. However, some users may desire messages to remain on the server for various reasons. For example, a user may wish to access his account from another device or via a web application. Accordingly, the client application 110 may be configured to "leave messages on the server" in which case requests to delete the message are not automatically generated by the client application 110 after they have been retrieved, instead requests to delete messages would be generated based on a user's actions indicating that the message should be deleted. Each time a user initiates a session, all undeleted messages must be reprocessed. As the number of undeleted messages grows, more resources are required and the processing time as perceived by the user increases. Therefore, in some embodiments, messages that are retrieved by the client application are marked for deletion (408) by the auxiliary gateway 128 to prevent an accumulation of messages that must be processed for each POP3 session.

The specifications for POP3 do not provide for the concept of a message having been read. The concept of a read message is independent from accessing messages for retrieval and deletion. Accordingly, it is up to the client applications to support such a concept. A client application 110 could keep track of which messages have been read and maintain a persistent state for the messages between sessions. However, the message/conversation server 102 typically does not know which messages a user read or accessed after those messages have been downloaded to the client application 110. For some users, it may be confusing for the message/conversation server 102 to continue to indicate that messages downloaded to a client application have not been read. Therefore, in some embodiments, messages which have been retrieved are marked as read (410) such as by disassociating a label "unread" from the retrieved messages, or equivalently by associating a "read" label with the retrieved messages. This allows the auxiliary gateway 128 to create persistent state information about the message between different applications, if desired. For example, messages which have been marked as read (410) would be indicated to conversation assistant 116 as having being read when the conversation assistant 116 receives information about messages and conversations. In some further optional embodiments, this option could be turned off or on according to user configured preferences. After processing of the retrieve command (406), and optional marking if implemented (408 and/or 410), the processing session resumes (403).

When the processing request is to end the session, a typical POP3 message server would respond by performing certain activities, one of which is to delete from memory those message which had been previously marked for deletion. In some embodiments of the invention, however, messages which are marked for deletion are not removed from memory. Instead, these messages are made unavailable for subsequent POP access (412) by setting a flag or label. Accordingly, when a subsequent POP3 session is established, these messages are not included in the list of messages available for access in accordance with the processes discussed in reference to FIG. 3. In some embodiments, these messages remain available to the conversation engine 118. In some embodiments, the messages marked for deletion are "moved" to a trash folder or are labeled with a trash label or flag (414). In some embodiments, moving messages to trash is accomplished by removing an "inbox" label, adding a "trash" label and adding a "read" label to each of the affected messages. In some embodiments, the messages marked for deletion are indicated as archived messages (416). In some embodiments, archiving messages is accomplished by removing an "inbox" label from and adding a "read" label to each of the affected messages; messages which do not have an "inbox" label are part of the message archive. One of ordinary skill in the art would recognize other ways to update or manipulate the state information for messages which have been affected by the POP3 session.

Figure 5:
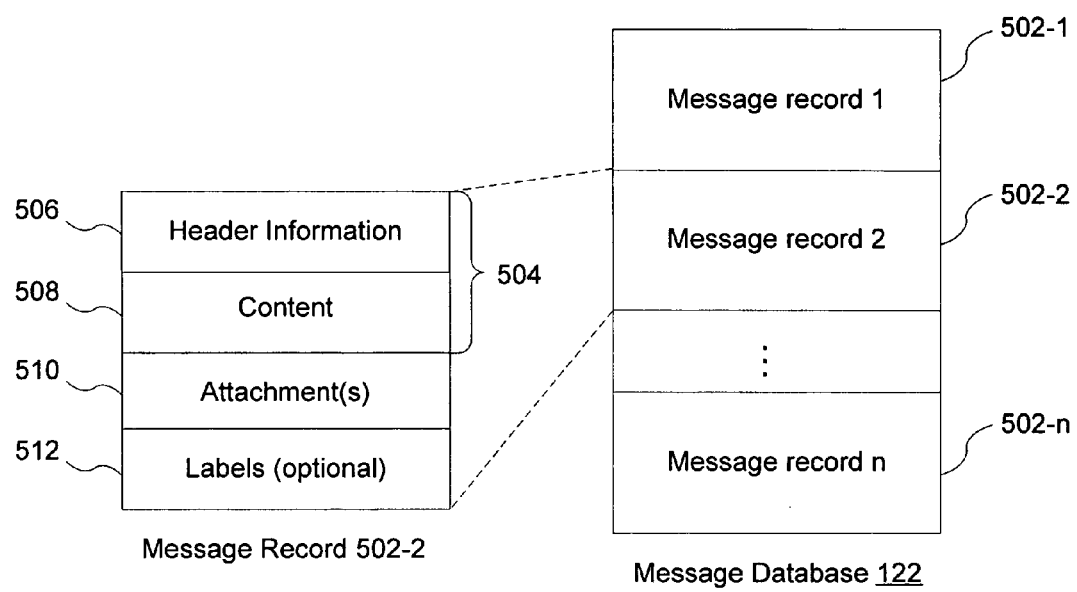
FIG. 5 illustrates a message database and message according to some embodiments of the invention.

As mentioned earlier, messages are stored in message database 122. FIG. 5 provides an illustration of the message database 122 according to one embodiment of the invention. The message database 122 may store the messages and message information about the messages, for example message record 1 (502-1) through message record n (502-n), where n represents the number of messages corresponding to a particular user. In some embodiments, a single message database 122 is used per user account, and, in others, messages from multiple users are stored in the same message database 122. One of ordinary skill in the art would recognize many ways to prevent messages from one user from being accessed by other users of the system.

In some embodiments, a message record (e.g., message record 502-2) may include a message 504 (including header information 506 and content 508) and attachments 510. Header information 506 may include the header information of the message including, for example, information identifying the sender and recipients, a time/date value of the message, and the subject. Other information might also be included in the header information, as described in RFC 2822. The content 508 may contain the content of the message. The content 508 may include text and/or other types of content (e.g., images or pictures). Attachment(s) 510 may be the contents of any information attached to a particular message. For example, a document attached to a message might be located in this part of message record 502-2. Those of ordinary skill in the art would recognize other ways to store the message information. For example, an attachment might be stored in another storage structure and a reference to it located in attachments 510. In some optional embodiments, the message record 502-2 may also include labels 512. Although the labels 512 are not considered part of the message 504, they are associated with it. The labels 512 can be provided to maintain persistent state information pertaining to the message for a number of purposes. Examples of such labels 512 include "read" when a message has been marked as read (or viewed or retrieved, in some embodiments); "inbox" if a message is associated with a user's inbox; or "unavailable" if the message 502-2 is not available for access during a POP3 session.

Figure 6:
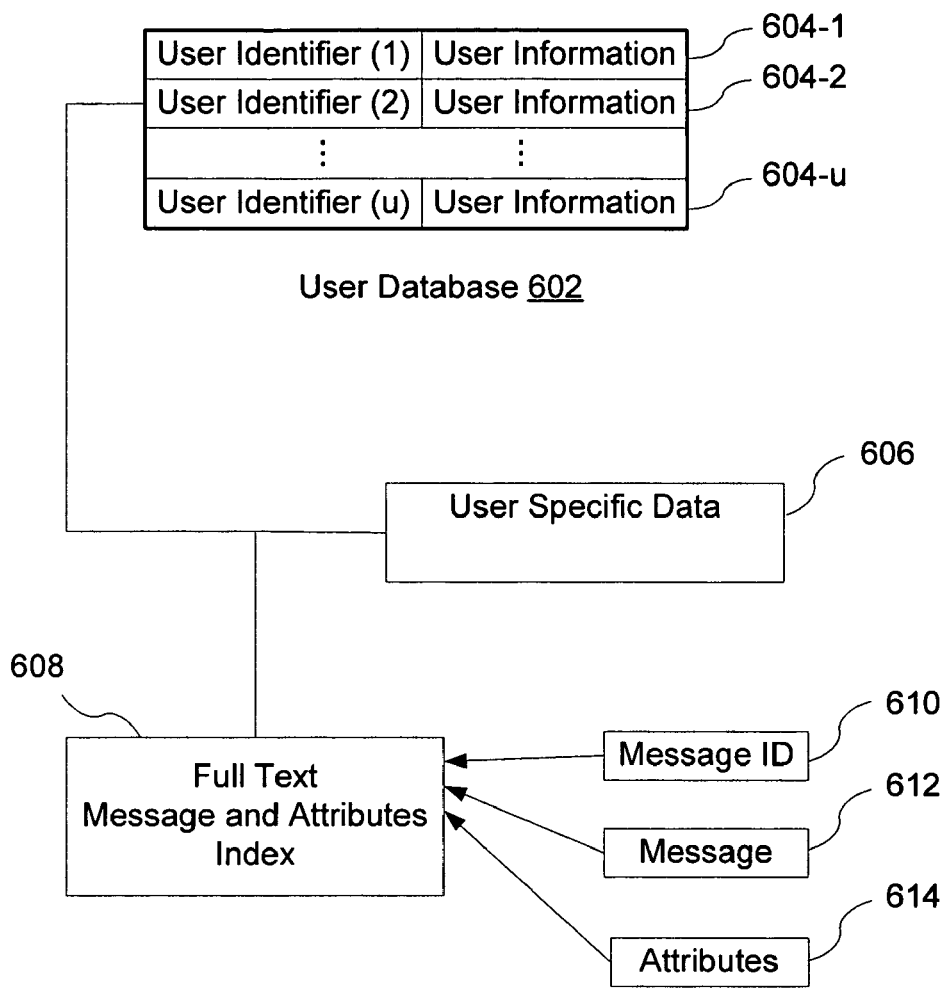
FIG. 6 illustrates various interrelations between databases and indices according to some embodiments of the invention.

FIG. 6 illustrates a user database and message index according to some embodiments of the invention. A user database 602 may store information about users in a number of records 604-1 to 602-*u*, where u represents the number of users for which information is stored. The records (e.g., record 604-2) may include user information and user identifier information. The user information may include information relating to user preferences, security information, and/or any other information used by the various embodiments of the invention. The user identifiers may be unique identifiers for each user, such as distinct n-bit binary values. Other types of user identification could also be used.

In some embodiments, the user identifier of a user record (e.g., 604-2) is used to identify a set of user specific data 606 which might contain information about filters, queries and labels associated with a user's account, for example.

The user identifier of a user may also be used to identify a full text and attributes index 608 corresponding to the user. In some embodiments, a full text and attributes index 608 is associated with only one user so that a different user cannot search the index for messages associated with the particular user. The full text and attributes index 608 stores information about messages in the user's mail account such that a query applied against the full text and attributes index 608 returns a list of matching messages (if any). The list might be returned as a list of conversations or as a list of message identifiers.

The information included in the full text and attributes index 608 for a particular message may include the message's message ID 610, the content 612 of the message associated with the message ID 610, and information about the attributes (614) of the message. The message ID 610 is a unique identifier for the message (i.e., unique with respect to all other messages stored for the same user). For example, the message ID 610 may be an n-bit number or value that is used to reference a particular message stored in the message database 122 (e.g., a 64-bit number).

The contents of a message are placed into the index as fully indexed and searchable terms. When the index 608 is searched for a term or combination of terms, the index 608 returns a list of conversations (e.g., conversation identifiers) that match the term or combination of terms in a query. Certain predefined conditions may dictate a return of less than all of the matching messages. In another embodiment, the index returns a list of messages (e.g., message identifiers) of messages that match the term or combination of terms.

Any attributes 614 associated with a message are also indexed (i.e., included in the index 608). Attributes 614 are added to the full text and attributes index 608 such that a query on a particular attribute returns those messages matching that particular attribute. When a label or attribute (as used herein, the terms label and attribute are interchangeable) is added to or removed from a conversation or an individual message, the index 608 is updated accordingly. The full text and attributes index 608 includes entries or data that map each defined label or attribute to all the messages (or, in other embodiments, conversations) bearing that label or attribute. Thus, when a label is added to a conversation, data is added to the full text and attributes index 608 to map that label to all the messages in the conversation. When a label is removed from a conversation, the data in the index that maps the label to the messages in the conversation is removed or invalidated. In some embodiments, each label or attribute associated with a conversation is also added to one or more entries in a conversation database (described below).

Figure 7:
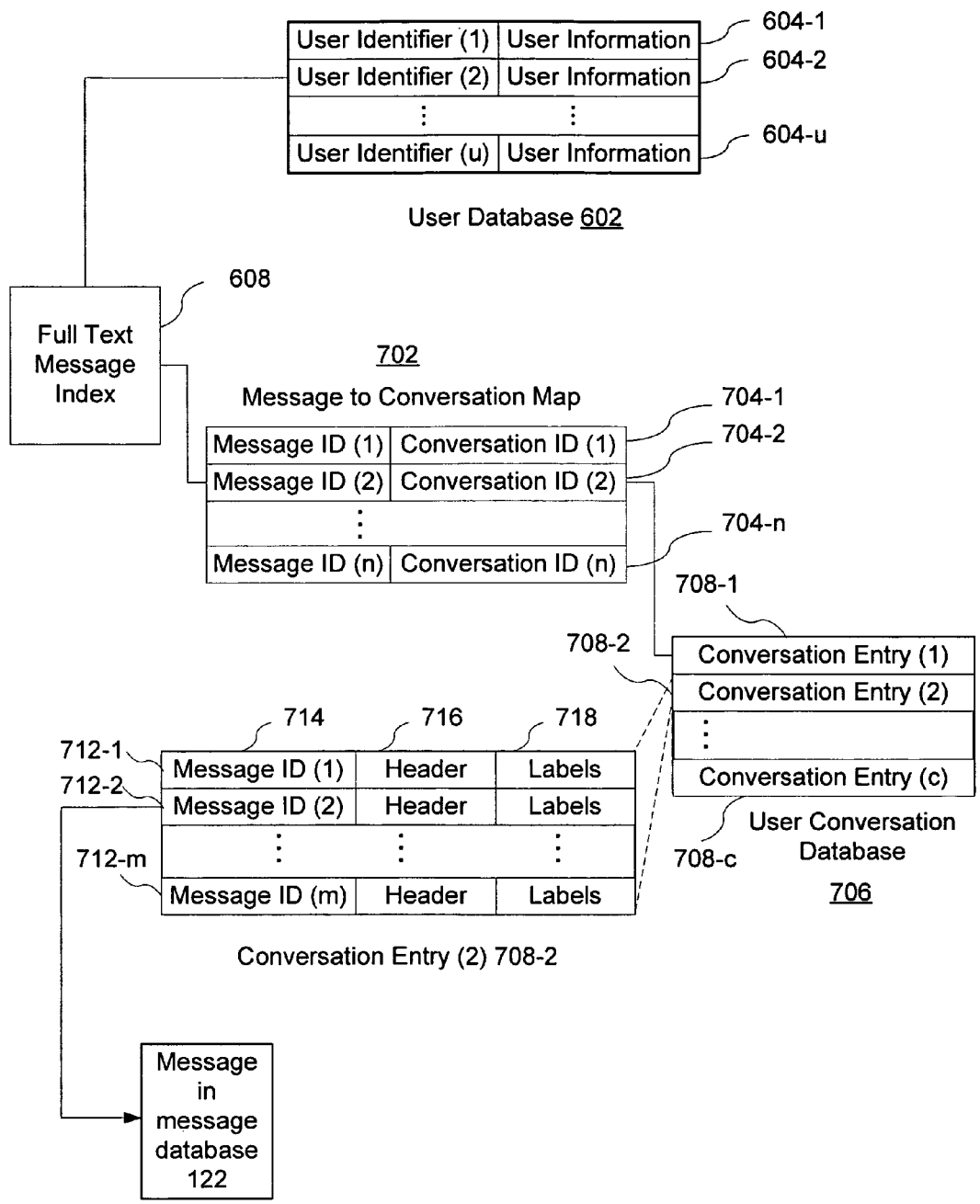
FIG. 7 depicts a set of data structures used for identifying a conversation corresponding to a message and attributes associated with the message according to some embodiments of the invention.

Although the full text and attributes index 608 may be configured to map query terms to individual message identifiers, other data structures may be provided to map message identifiers into conversations identifiers. Logical diagrams of one such exemplary set of data structures are shown in FIG. 7. One of ordinary skill in the art would recognize that a number of different data structures could be used to map search query terms to conversations or conversation identifiers.

As described earlier, user database 602 may contain a user identifier (e.g., the user identifier of record 604-2) that references the full text and attributes index 608 associated with a particular user. A particular message ID may be associated with a particular conversation ID in a "message to conversation map" 702 containing a number of entries 704-1 to 704-*n*, where n is the number of messages being maintained. Each entry 704 in the message to conversation map 702 associates (i.e., maps) a message ID to a conversation ID. In some embodiments, the conversation ID is an n-bit number. This number uniquely identifies the particular conversation to which the message identified by message ID belongs. In these embodiments, every conversation in a user's mail account has a distinct conversation ID. In some embodiments, the conversation ID assigned to each conversation is not equal to and is not based on (i.e., derived from) the subject of a message in the conversation.

To identify the other messages associated with a particular conversation, a user conversation database 706 may be used. Such a database might be used, for example, when identifying the remainder of the messages included in a conversation where one or more messages matched a particular search query (e.g., 704-2). The user conversation database 706 includes a number of conversation entries 708-1 to 708-*c*, where c is the number of conversations being maintained. Each conversation entry 708 stores a list of the messages (or other data structure representing the messages) associated with the conversation. For example, a conversation entry 708-2 may include a linked list of message entries 712-1 to 712-*m*, where m is the number of messages in the conversation, and each message entry 712 corresponds to a particular message in the conversation. The linked list might be ordered by, for example, date/time values associated with the messages in the conversation. An exemplary message entry 712-1 includes the message ID (1) 714, header 716, and labels 718 of a particular message. The header 716 may contain all or a portion of the header information 504 described earlier. The labels 718 may contain information identifying certain attributes associated with the message similar to those described above in reference to labels 512 and attributes 614. The message ID of a particular entry (e.g., entry 712-2) may be associated with a particular message in the message database 122.

As indicated above, in another embodiment the full text message index 608 returns a list of conversation identifiers in response to a query. In this embodiment, the message to conversation map 702 may be omitted. Instead, the conversation database 706 provides the main mappings needed to complete the processing of conversations responsive to the query.

Figure 8:
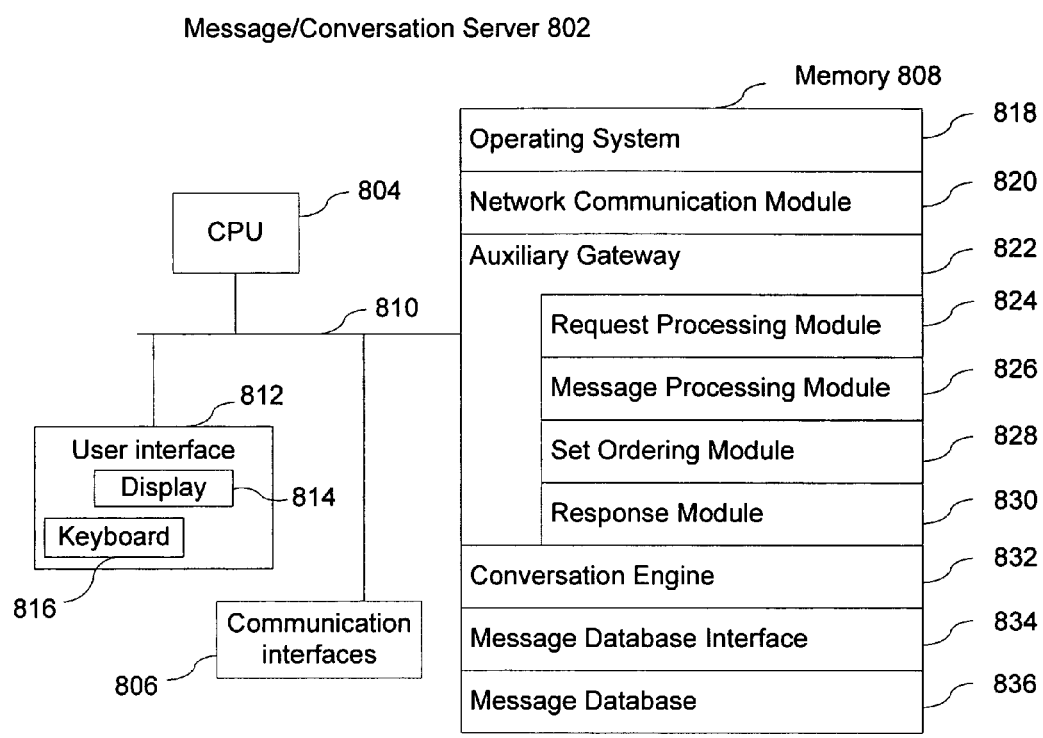
FIG. 8 depicts an embodiment of a conversation server according to some embodiments of the invention.

Referring to FIG. 8, an embodiment of a message/conversation server 802 that implements the methods described above includes one or more processing units (CPU's) 804, one or more network or other communications interfaces 806, a memory 808, and one or more communication buses 810 for interconnecting these components. The message/conversation server 802 may optionally include a user interface 812 comprising a display device 814 and a keyboard 816. The memory 808 may include high speed random access memory and may also include non-volatile memory, such as one or more magnetic or optical storage disks. the memory 808 may include mass storage that is remotely located from CPU's 804. The memory 808 may store the following elements, or a subset of such elements:

- an operating system 818 that includes procedures for handling various basic system services and for performing hardware dependent tasks;
- a network communication module (or instructions) 820 that is used for connecting the message/conversation server 802 to other computers via the one or more communications network interfaces 806 (wired or wireless), such as the Internet, other wide area networks, local area networks, metropolitan area networks, and so on;
- an auxiliary gateway 822 including a request processing module (or instructions) 824 for receiving message processing requests as described above, a message processing module (or instructions) 826 for removing messages from the set of messages available for access by a client application while leaving the message in the message database 122 for access by a second application as described above, a set ordering module (or instructions) 828 that orders messages in accordance with a date/time value as described above, and a response module (or instructions) 830 for providing messages to the client application in response to a retrieval request;
- a conversation engine (or instructions) 832 module for responding to requests from, and providing responses to, the conversation assistant 116 as described earlier;
- a message database interface (or instructions) 834 which enables searches on and modifications to the message database 122; and
- a message database 122 as described above.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for processing messages, comprising:
   at a message server:
      entering into a first processing session with a first client application, the first processing session associated with a user account;
      identifying a set of messages available for access by the first client application;
      receiving from the first client application a message processing request for a message, the message stored in a message database and included in the set of messages, wherein the message database includes a corpus of messages associated with the user account;
      in response to the message processing request, removing the message from the set of messages available for access by the first client application, wherein after the removal, the set of stored messages available for access by the first client application is a subset of the corpus of messages associated with the user account; and
      maintaining the message in association with the user account in the message database for access by a second client application for during a second processing session associated with the user account, wherein the second client application is distinct from the first client application and wherein the message remains available to the second client application subsequent to the removing operation.

2. The method of claim 1, wherein the message processing request is a request to delete the message.

3. The method of claim 2, wherein
   removing the message from the set of messages available for access by the first client application comprises setting an application flag associated with the message; and
   identifying the set of stored messages available for access by the first client application includes identifying only stored messages for which the application flag is not set.

4. The method of claim 1, further including:
   ordering the set in accordance with a date/time value from newest to oldest; and
   providing messages to a client in accordance with the set as ordered.

5. The method of claim 4, wherein the set is ordered in accordance with a time/date value of a conversation to which each of the respective messages of the set belongs.

6. The method of claim 1, further including entering the first processing session in accordance with POP3.

7. The method of claim 6, further including entering the second processing session in accordance with POP3.

8. The method of claim 1, wherein the second client application is a conversation-based messaging program.

9. The method of claim 1, wherein the second client application is a web-based messaging program.

10. The method of claim 1, wherein the message processing request is a request to retrieve the message.

11. A method for processing messages, comprising:
    at a message server:
       entering into a first processing session with a first client application, the first processing session associated with a user account;
       identifying a set of messages available for access during the first processing session by the first client application;
       receiving from the first client application a message processing request for a message, the message stored in a message database and included in the set of messages, wherein the message database includes a corpus of messages associated with the user account;
       in response to the message processing request, making the message unavailable for a second processing session with the first client application, the second processing session associated with the user account, wherein messages still available for access by the second processing session with the first client application are a subset of the corpus of messages associated with the user account; and
       maintaining the message in association with the user account in the message database for access by a second client application during a third processing session associated with the user account, wherein the second client application is distinct from the first client application and wherein the message remains available to the second client application subsequent to making the message unavailable for the second processing session with the first client application.

12. A method for processing messages at a message server, comprising:
at the message server:
entering into a first session with a first client application, the first session associated with a user account;
receiving from the first client application a message processing request for a message, the message stored in a message database and associated with the user account, wherein the message database includes a corpus of messages associated with the user account;
making the message unavailable for a second session with the first client application wherein messages still available for access by the second session with the first client application are a subset of the corpus of messages associated with the user account; and
maintaining the message in association with the user account in the message database for access by a second client application, distinct from the first client application, wherein the message remains available to the second client application subsequent to making the message unavailable for the second session with the first client application.

13. A non-transitory computer-readable storage medium storing one or more programs configured for execution by a server system comprising one or more processors, the one or more programs comprising:
instructions for entering into a first processing session with a first client application, the first processing session associated with a user account;
instructions for identifying, at a message server, a set of messages available for access by the first client application, wherein the set of messages is stored in a message database which includes a corpus of messages associated with the user account;
instructions for receiving, at the message server, from the first client application a message processing request for a message, the message stored in the message database and included in the set of messages; and
instructions for responding to the message processing request by removing, at the message server, the message from the set of messages available for access by the first client application while maintaining the message in association with the user account in the message database at the message server for access by a second client application during a second processing session associated with the user account, wherein the second client application is distinct from the first client application and wherein the message remains available to the second client application subsequent to the removing operation, wherein the set of messages available for access by the first client application subsequent to the removing operation is a subset of the corpus of messages associated with the user account.

14. The non-transitory computer-readable storage medium of claim 13, wherein the message processing request is a request to delete the message.

15. The non-transitory computer-readable storage medium of claim 13, wherein
the instructions for removing the message from the set of messages available for access by the first client application include instructions for setting an application flag associated with the message; and
the instructions for identifying the set of messages available for access by the first client application include instructions for identifying only stored messages for which the application flag is not set.

16. The non-transitory computer-readable storage medium of claim 13, the one or more programs further including instructions for limiting a size of the set in accordance with a predefined limit.

17. The non-transitory computer-readable storage medium of claim 16, wherein the predefined limit comprises a predefined number of messages.

18. The non-transitory computer-readable storage medium of claim 16, wherein the predefined limit comprises a predefined number of conversations, and the one or more programs include instructions for limiting the set to messages associated with no more than the predefined number of conversations.

19. The non-transitory computer-readable storage medium of claim 16, wherein the predefined limit comprises a predefined number of conversations, and the one or more programs include instructions for limiting the set to messages not previously retrieved by the first client application and that are associated with no more than the predefined number of conversations.

20. The non-transitory computer-readable storage medium of claim 13, the one or more programs further including:
instructions for ordering the set in accordance with a date/time value from newest to oldest; and
instructions for providing messages to a client in accordance with the set as ordered.

21. The non-transitory computer-readable storage medium of claim 20, the one or more programs further including instructions for ordering the set in accordance with a time/date value of a conversation to which each of the respective messages of the set belongs.

22. The non-transitory computer-readable storage medium of claim 13, the one or more programs further including instructions for entering the first processing session in accordance with POP3.

23. The non-transitory computer-readable storage medium of claim 22, the one or more programs further including instructions for entering the second processing session in accordance with POP3.

24. The non-transitory computer-readable storage medium of claim 13, wherein the second client application is a conversation-based messaging program.

25. The non-transitory computer-readable storage medium of claim 13, wherein the second client application is a web-based messaging program.

26. The non-transitory computer-readable storage medium of claim 13, wherein the message processing request is a request to retrieve the message.

27. A message server system for processing messages, comprising:
one or more processors; and
memory including:
a message database, including a corpus of messages associated with a user account and including a set of messages available for access by a first client application
a module for entering into a first processing session with the first client application, the first processing session associated with the user account;
a request processing module for receiving from the first client application a message processing request for a message, the message stored in the message database and included in the set of messages; and a message processing module for removing the message from the set of messages available for access by the first client application in response to the request processing module while leaving the message associated with the user account in the message database for access by a second client application during a second processing session associated with the user account, wherein the second client application is distinct from the first client application and wherein the message remains available to the second client application subsequent to the removing operation, wherein the set of messages available for access by the first client application subsequent to the removing operation is a subset of the corpus of messages associated with the user account.

28. The system of claim 27, wherein the message processing request is a request to delete the message.

29. The system of claim 27, further comprising
an application flag associated with the message that is set by the request processing module in response to the message processing request; and
a search module for identifying the set of messages available for access by the first client application by identifying only stored messages for which the application flag is not set.

30. The system of claim 27, further including:
a set ordering module for ordering the set in accordance with a date/time value from newest to oldest; and
a response module for providing messages to a client in accordance with the set as ordered.

31. The system of claim 30, wherein the set ordering module orders messages in accordance with a time/date value of a conversation to which each of the respective messages of the set belongs.

32. The system of claim 27, wherein the first processing session is in accordance with POP3.

33. The system of claim 32, wherein the second processing session is in accordance with POP3.

34. The system of claim 27, wherein the second client application is a conversation-based messaging program.

35. The system of claim 27, wherein the second client application is a web-based messaging program.

36. The system of claim 27, wherein the message processing request is a request to retrieve the message.

37. The method of claim 1, including:
after the removing operation:
receiving from the second client application a retrieval request for the message; and
providing the message to the second client application.

38. The method of claim 11, including:
after making the message unavailable for the second processing session with the first client application:
receiving from the second client application a retrieval request for the message; and
providing the message to the second client application.

39. The method of claim 12, including:
after making the message unavailable for the second session with the first client application:
receiving from the second client application a retrieval request for the message; and
providing the message to the second client application.

40. The non-transitory computer-readable storage medium of claim 13, the one or more programs further including:
instructions for receiving, from the second client application, a retrieval request for the message after removing the message from the set of messages available for access by the first client application; and
instructions for providing the message to the second client application in response to the retrieval request.

41. The system of claim 27, wherein the request processing module is configured to receive from the second client application a retrieval request for the message and provide the message to the second client application after removing the message from the set of messages available for access by the first client application.

42. The method of claim 1, wherein the first processing session is a POP session.

* * * * *